Nov. 26, 1935.  S. F. OSSING  2,022,147
MATERIAL HANDLING MECHANISM
Filed May 11, 1933
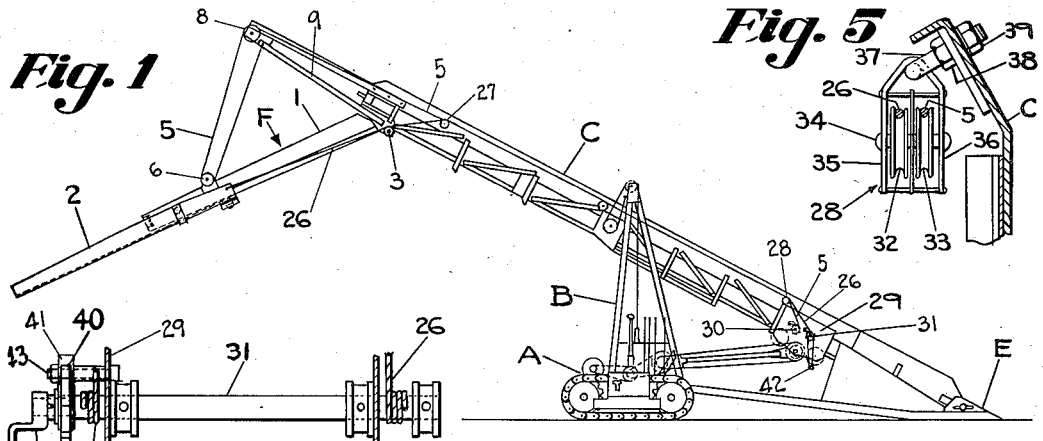
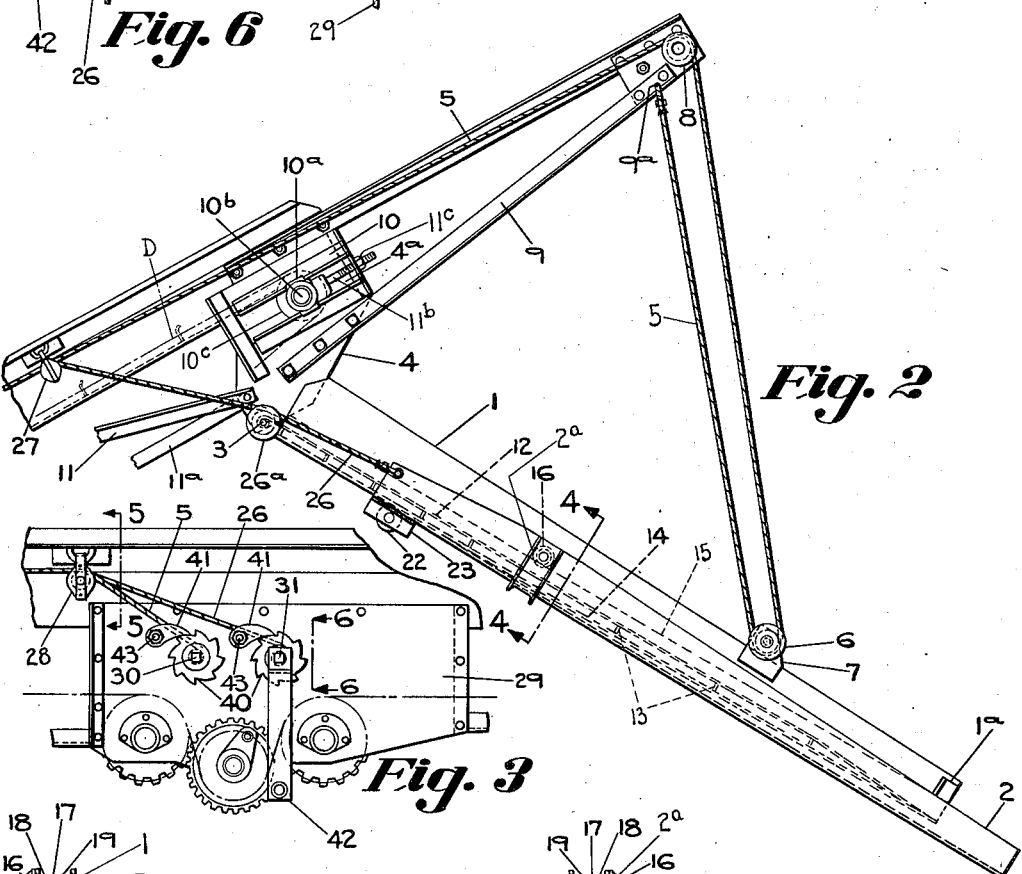
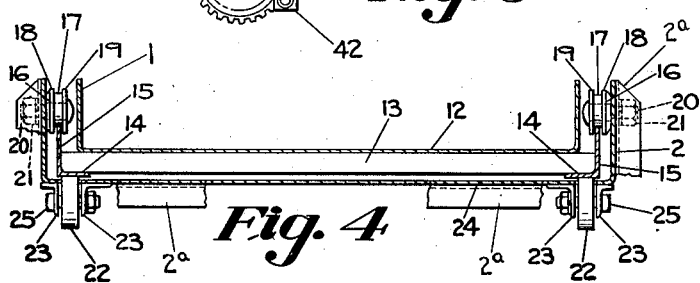
INVENTOR:
Stanley F. Ossing,
By
Chas. M. Nissen,
ATT'Y.

Patented Nov. 26, 1935

2,022,147

UNITED STATES PATENT OFFICE 2,022,147

MATERIAL HANDLING MECHANISM

Stanley F. Ossing, Columbus, Ohio, assignor to The Jeffrey Manufacturing Company, a corporation of Ohio Application May 11, 1933, Serial No. 670,523

7 Claims. (Cl. 193—3)

The material handling mechanism of the present invention deals especially with an improved form of loading apparatus which is easily adjustable to adapt it to highly diversified uses, the advantages of which will become more clearly apparent hereinafter.

In general, the improved apparatus is of a type wherein loose material may be expeditiously loaded into a car or truck, or any other variety of conveyance, or unloaded from a hopper bottom car and stored in a pile on the ground. Generally speaking, it includes a mobile carrier supporting an adjustable boom which has mounted thereupon conveying instrumentalities adapted to be brought into engagement with the loose material and to gather the said material onto the conveyor for continuously moving it to the discharge mechanism by which it is discharged and guided into the vehicle or other device intended to be loaded.

More specifically, the mechanism of the present invention deals with the discharge mechanism above referred to, which includes a pair of cooperating chute members mounted for relative telescopic movement, and operable from a distant point, independently of each other by mechanism within convenient reach of an operator standing on the ground, by which mechanism the discharge end of the chute may be adjusted relative to the vehicle, or other body being loaded, so that the discharge end of the chute may be brought into close association with the said body so that breakage of the material will be reduced to a minimum and to direct, most efficiently, flow of material from the chute, so that loss or wastage of the material may be avoided.

In addition to the telescopic discharge chute, the invention contemplates the provision of means for raising the chute sections bodily together in a vertical plane and mechanism for releasably locking the sections in predetermined adjusted position, both with reference to the telescopic adjustment and with reference to the aforesaid vertical adjustment.

The boom carrying the conveyor and discharge instrumentalities is mounted upon a carriage of suitable type, provided with a suitable source of power and suitable traction devices whereby the carriage may be propelled along the ground, and the mechanism for operating the chute devices may also be actuated. As the loading operations proceed, the carriage is moved into the pile of material so that the usual gathering instrumentalities on the conveyor may be continuously thrust into the pile of material and gradually fed forward into the pile as the loading operation progresses.

The details of the present improved construction may be more readily understood by reference to the accompanying drawing, in which:

Fig. 1 is a diagrammatic side elevation of a material handling apparatus of the above indicated type, embracing the present improvements;

Fig. 2 is a detailed elevation of the discharge end of the boom looking at the side opposite to that shown in Fig. 1 and showing the improved chute construction;

Fig. 3 is an enlarged fragmentary elevation of the actuating instrumentalities for the chute, and means for locking the chute in desired adjusted position;

Fig. 4 is a sectional view on the line 4—4 of Fig. 2, looking in the direction of the arrows, certain parts being broken away for clarity;

Fig. 5 is a fragmentary sectional view through a part of the boom, showing the arrangement of pulley sheaves for guiding the control cables employed for adjusting the chute, the view being on the line 5—5 of Fig. 3; and Fig. 6 is a sectional view through a part of the boom showing one of the shafts which control the adjustment of the chute, the view being taken on the line 6—6 of Fig. 3.

Referring more particularly to the drawing, it will be seen that the apparatus is mounted on a carriage provided with the usual endless traction devices. This carriage is provided with a mast B, which carries in any suitable manner, the boom C.

The boom C carries a conveyor mechanism indicated at D, having its lower end provided with instrumentalities, indicated generally at E, which are adapted to enter into a pile of loose material, such as for example coal, and to crowd the material onto the conveyor as the carriage A progressively and continuously thrusts the end E of the conveyor into the material.

The conveyor D discharges the material into the chute F, from which it passes into the object to be loaded, such as a truck, railway car, or the like; and this invention is principally concerned with the construction of this chute; and because of the construction thereof, which is about to be described, the loading of the material may be regulated in such a manner that loss and wastage is minimized, or where, as in the case of coal, it is desirable to keep the lumps from breaking, the height of the discharge drop can be so regulated that the fall will be insufficient to produce any substantial deleterious fracture of the lumps.

As will be seen from the drawing, the chute F is composed of two parts indicated respectively at 1 and 2, and braced by a channel member 2a, the chute being pivotally interconnected to the boom by pivot mounting 3 and bracket plate 4, welded or otherwise secured to the boom, and to a take-up frame 4a at the end of the boom. The pivot 3 enables the chute to swing vertically for adjustment of its elevation, this adjustment being accomplished by means of a cable 5 on each side of the boom, one end of which is fastened to the extension 9, as shown at 9a and then passed around pulley 6 mounted on the chute through a bracket 7, the cable then passing over pulley 8 mounted on extension 9 carried by the boom. The cable 5 is actuated by instrumentalities to be later described.

The take-up frame 4a is provided with the usual angle guides 10 for the bearing 10a of the head shaft 10b, upon which is mounted the head pulley 10c, adjustably positioned in the guides 10 by means of the threaded bolt 11b and nut 11c. Adjustment of the nut relative to the bolt will adjust the position of the pulley to take up the slack in the conveyor belt. When nut 11c is loosened, the pulley will tend to drop by gravity to the lower end of guides 10 to enable the conveyor belt to be slipped off the pulley whenever desired. Secured to the bracket plate 4 are the braces 11 and return guides 11a which support the return strand of the conveyor chain in well-known manner.

It will be observed that section 1 of chute F is mounted interiorly of section 2, the latter being longitudinally adjustable relative to section 1, so that the two sections telescope relatively to each other. For mounting section 2 in this manner, section 1 has secured to the underside of its bottom 12, as by welding or equivalent means, a plurality of transversely extending bars 13, to the ends of which are welded angle members 14, having upstanding flanges 15.

Section 2 is suspended from these angles 14 by means of rollers, or the like, 16, grooved at 17 to provide flanges 18 and 19 on each side of each angle flange 15, the latter thereby forming tracks upon which rollers 16 run. Rollers 16 are mounted on bolts 20, forming axles which are passed through suitable openings in the sides of section 2, and which are secured in place by nuts 21.

Cooperating with rollers 16 are rollers 22 mounted in brackets 23, welded or otherwise secured to the bottom 24 of section 2, which bottom is provided with holes or slots for passage of rollers 22. These rollers 22 are mounted on bolts 25, passing through the brackets 23, and are adapted to run along the underside of angles 14. It will be seen that rollers 16 running on the top of flanges 15a of angles 15, together with the rollers 22 engaging the underside of the angles 14, maintain section 2 in proper alinement with section 1, the angles 14 in cooperation with the upper and lower rollers restraining section 2 against turning movement relative to section 1.

It will be seen that the brackets 23 are mounted at one end of the section 2, which end is secured by cables 26 which pass over pulley sheaves 26a mounted for rotation on pivots 3 and on the outside of each bracket plate 4, then passes through pulley blocks 27 and 28 to the hoist mechanism now to be described.

Mounted on the sides of the boom, at a suitable distance from the bottom end thereof, are plates 29 carrying shafts 30 and 31 upon which are wound cables 5 and 26 respectively. On the way to shafts 30 and 31 the cables run side by side, passing through a suitable number of pulley blocks 27 and 28, each of which is provided with a pair of pulleys disposed in side by side relation as indicated at 32 and 33, Fig. 5, mounted on a common axle 34 extending through side plates 35 and 36 of the pulley block.

Each pulley block is mounted in a hanger 37 which is conveniently U-shaped, and which is secured in place by nuts 38 and 39 with which each leg of the hanger is provided, and which engage the sides of the boom C, which is of angular cross-section, as clearly shown in Fig. 5.

Each shaft 30 and 31 is provided with a ratchet 40, the teeth of which interlock with pawls 41 upon tendency of the shafts to counter-rotate, thus preventing such counter-rotation of the shafts and maintaining the chute sections in desired position of adjustment.

As will be seen from Fig. 3, the shafts 30 and 31 have squared ends, upon which may be fitted a lever, indicated at 42, the shafts being actuated by manually turning the lever, which is in easy reach of an operator standing on the ground.

Each pawl 41 is pivotally mounted on pivots 43, whereby the pawls may be released from the ratchets to permit unwinding of the cables when desired. The shafts are of course entirely independently operable.

It will be understood that when the winding shafts are released, section 2 slides downwardly, by gravity, relative to section 1 until rollers 16 engage abutments 1a fixed on both sides of section 1, and are stopped thereby; and also the weight of the chute assembly will cause the latter to swing vertically around pivot 3, upon release of cable 5, when it is desired to lower the entire chute structure.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Material handling mechanism comprising a chute formed of a pair of relatively telescopic sections, reinforcing means for one of the said sections secured to such section, and supporting means for the other section cooperating with the top and bottom surfaces of the said reinforcing means, the said supporting means being freely movable along the reinforcing means and preventing relative turning movement between the sections.

2. Material handling mechanism comprising a chute formed of a pair of relatively telescopic sections, reinforcing means for one of the sections and vertically disposed rollers for the other section engaging the upper and lower surfaces of the reinforcing means for preventing turning movement between the sections while enabling free relative telescopic movement therebetween.

3. A material handling machine comprising the combination with supporting mechanism, of a sectional extensible discharge chute carried by the mechanism, one of the sections being mounted interiorly of its adjacent section, the inner section being provided with transversely extending reinforcing members having ends projecting beyond the sides of the inner section, means interconnecting the respective ends of the reinforcing members and forming continuous tracks therealong, devices secured to the outer section engaging the said tracks for supporting the outer section on the inner section and the devices being adapted to travel freely along the said tracks, and means mounted on the outer section engaging the underside of the said tracks and cooperating with the said devices for maintaining the outer section in alinement with the inner section and restraining the outer section against turning movement relative to the inner section while enabling the outer section to move freely relatively to the inner section.

4. A material handling machine comprising the combination with supporting mechanism, of a sectional extensible discharge chute carried by the mechanism, one of the sections being mounted interiorly of its adjacent section, the inner section being provided with transversely extending reinforcing members having ends projecting beyond the sides of the inner section, angle bars interconnecting the respective ends of the reinforcing members and forming continuous tracks therealong, the angle bars having one flange extending upwardly and parallel to the inner member of the chute and having their other flange secured beneath the reinforcing members to form a continuous track therebeneath, flanged rollers secured to the outer section engaging the vertical flanges of the angle bars and suspending the outer section from the inner section and running along the said vertical flanges as tracks, and additional rollers mounted on the outer section engaging the under side of the said angle bars and cooperating with the aforesaid rollers for maintaining the outer section in alinement with the inner section and restraining the outer section against turning movement relative to the inner section while enabling the outer section to move freely relatively to the inner section.

5. A material handling machine comprising the combination with supporting mechanism, of a sectional extensible discharge chute associated with the said mechanism for adjusting the sections by longitudinal movement relatively to each other, reinforcing means secured to the receiving section, devices on the discharge section in position to engage the upper and lower portions of the said reinforcing means for carrying said discharge section on said reinforcing means and affording traction for the discharge section while preventing relative lateral turning between the sections, said devices engaging the lower portions of said reinforcing means being located at the rear end of said discharge section to afford abutment mechanism between such rear end of the discharge section and the bottom of the receiving section.

6. In material handling mechanism, the combination with a support, of a receiving chute section, a discharge chute section adapted to be extended out from under the receiving section, spaced-apart longitudinally extending angle members attached to said receiving section, one on each side thereof, and each having one flange thereof extending upwardly, rollers carried by said discharge section adapted to ride on said upstanding flanges and additional rollers carried by said discharge section adapted to ride on the other flanges of said angle members.

7. In material handling mechanism, the combination with a support, of a receiving chute section, a discharge chute section adapted to be extended out from under the receiving section, spaced-apart longitudinally extending angle members attached to said receiving section, one on each side thereof, and each having one flange thereof extending upwardly, and means carried by said discharge section adapted to cooperate with both flanges of said angle members to attach said sections for telescoping adjustment with respect to each other.

STANLEY F. OSSING.